Patented Apr. 11, 1950

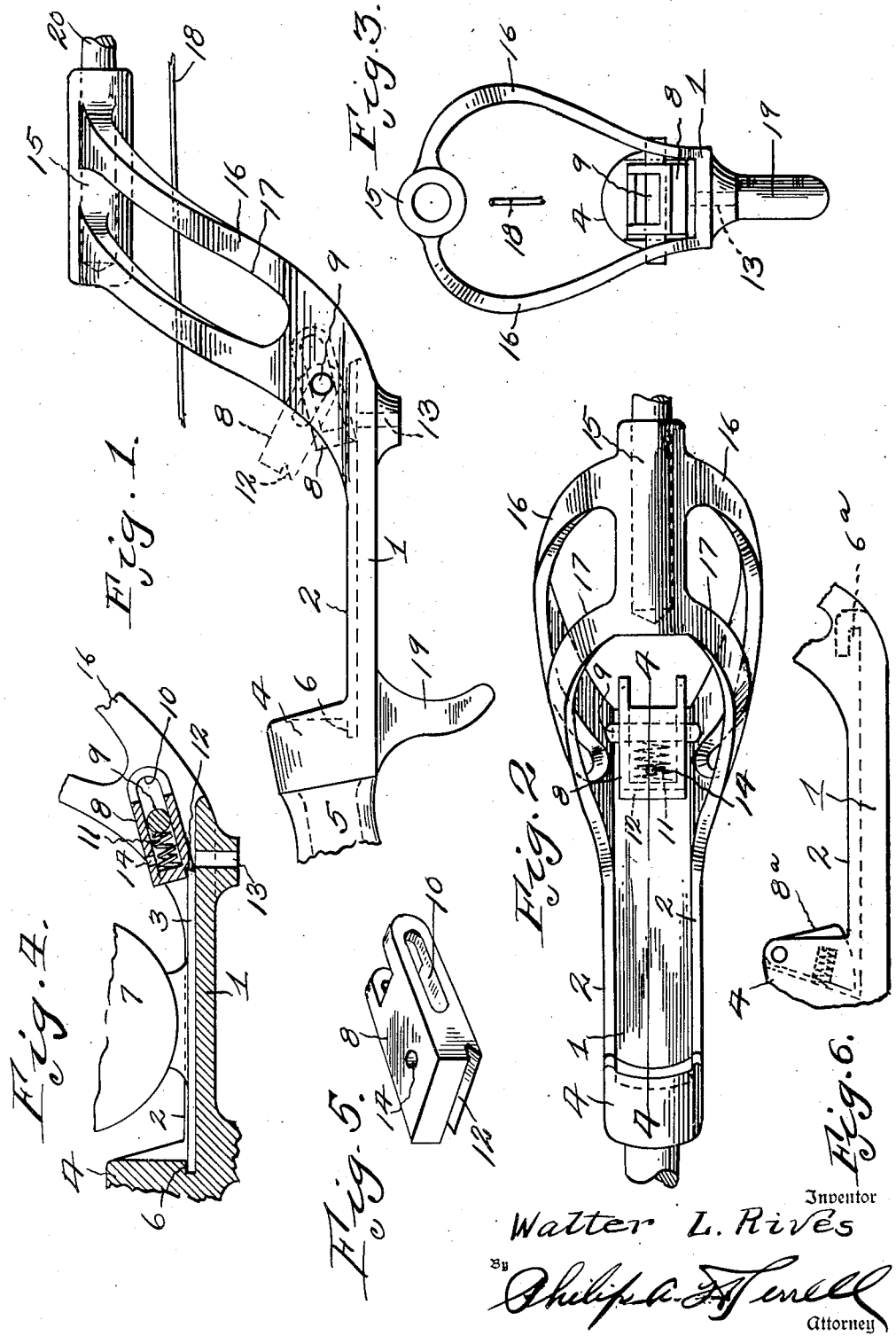

2,503,510

UNITED STATES PATENT OFFICE 2,503,510

FISHING ROD REEL MOUNT

Walter L. Rives, Jacksonville, Fla.

Application January 8, 1948, Serial No. 1,218

1 Claim. (Cl. 43—22)

The invention relates to fishing rod reel mounts, and has for its object to provide a reel mount downwardly off set from the inner end of the rod, and so constructed that the line leading from the reel will be below the fishing rod so it will easily feed through the guide eyes on the under side of the rod with the minimum amount of friction, and in a manner whereby bights in the line, during a casting operation, will not encircle any of the eyes.

A further object is to provide a reel mount downwardly off set from the rod, and having its rear end terminating in a handle, and its forward end connected to the rod by outwardly bulged webs forming a relatively large opening through which the line can feed without engagement with the webs, and in a position where the line can be easily observed as it is fed to the guide eyes on the rod.

A further object is to provide a spring latching means, rockable on a shaft connecting the webs at their lower ends for latching the reel on the mount. Also to provide the mount with an aperture extending upwardly from the under side thereof for the reception of a tool for forcing the latching means to unlatched position when it is desired to remove the reel from the reel mount.

A further object is to provide a reel mount downwardly off set in relation to the rod proper, and in a position in relation to the handle of the rod to position the weight of the reel, adjacent the axis of the handle, thereby overcoming any twisting action, incident to the rod proper being above the axis of the handle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of a reel mount.

Figure 2 is a top plan view of the reel mount.

Figure 3 is a front elevation of the reel mount.

Figure 4 is a longitudinal sectional view taken on line 4—4 of Figure 2.

Figure 5 is a perspective view of the latching member shown in Figure 4.

Figure 6 is a view similar to Figure 4, but showing the spring latch at the rear end of the mount.

Referring to the drawings, the numeral 1 designates the reel mount, the upper side of which is provided with longitudinally extending marginal flanges 2 for preventing lateral twisting or displacing of the reel base plate 3. The rear end of the reel mount 1 terminates in an upwardly extending member 4, to which member is attached the handle grip 5, which inclines slightly downwardly. Member 4, on its outer face, is provided with a recess 6 for receiving one end of the base 3 of the reel 7, and the other end of the base extends forwardly as shown in Figure 4, and is held in place by a spring actuated pivoted latching member 8. The pivoted laching member is transversely slidable and rockable on a transverse pin 9, which pin extends through elongated openings 10 in the latching member 8. Disposed within the latching member 8 is expansion spring 11, which spring normally forces the latching member towards the reel.

Referring to Figure 1, it will be seen that when the reel is placed in position on the mount, the latching member is in a raised dotted line position, and at which time one end of the reel mount 3 can be placed in the recess 6, and the other end in the transverse groove 12 in the latch 8, and then by forcing the reel downwardly, the latching member 8 will longitudinally move and will snap past a line drawn between recess 6 and the axis of the pin 9, consequently the reel will be held in position. When it is desired to release the reel, a tool is inserted upwardly through the opening 13 in the mount 1, and into engagement with the latch 8 so that the latch can be forced upwardly. Latch 8 is preferably provided with a lubricant opening 14.

Heretofore, under rod guides have been made, however it has been found that they are usually so constructed that additional friction is imparted on the line, incident to guide eyes adjacent the reel mount, and also because the operator can not observe the line as it feeds to the eyes on the under side of the rod. To obviate this difficulty the forward end of the mount 1 is connected to the rod supporting sleeve 15 by outwardly bulged and forwardly inclined webs 16. Webs 16 are preferably provided with sight openings 17 therein, therefore it will be seen that the fishing line 18 can be easily observed at all times during the various fishing operations, and by eliminating the additional friction the slightest pull or bite on the line will be noted.

Referring to Figure 6, wherein a modified form of reel latch is provided, the structure is substantially the same, except the forward end of the reel mount is provided with a reel base receiving recess 6a, and the upwardly extending portion 4 is provided with a spring actuated latch 8a; otherwise the structure and operation is the same as in Figure 1.

The under side of the reel mount 1 is provided with a finger engaging member 19 so the operator can place the forefinger around the same for steadying the device.

From the above it will be seen that an underslung reel mount is provided for fishing rods of various kinds, particularly adapted where a line is fed through guide eyes on the under side of a rod as distinguished from those on the upper side of the rod. It will also be seen that friction is reduced to a minimum on the line, thereby increasing the life of the line, and that the line is in full view of the operator at all times during a fishing operation.

The invention having been set forth what is claimed as new and useful is:

A reel mount for fishing reels used in connection with fishing rods, said reel mount comprising a downwardly offset rearwardly extending seat, a rearwardly extending handle member carried by said seat, means for anchoring a reel on the seat, and outwardly arced, upwardly inclined and forwardly extending webs carried by opposite sides of the forward end of the seat, said webs being adapted to be connected to a rod supporting sleeve and providing a relatively large line observing opening therebetween.

WALTER L. RIVES.

REFERENCES CITED

The following references are of record in the file of this patent:

UNITED STATES PATENTS

| Number | Name | Date |
| --- | --- | --- |
| 2,431,972 | Treadway et al. | Dec. 2, 1947 |